(12) United States Patent
Schultz et al.

(10) Patent No.: US 11,535,286 B2
(45) Date of Patent: Dec. 27, 2022

(54) TARGET ACTIVATION SYSTEM FOR TRANSPORTATION NETWORK

(71) Applicant: Westinghouse Air Brake Technologies Corporation, Wilmerding, PA (US)

(72) Inventors: Timothy Allen Schultz, Marion, IA (US); Jeffrey D. Kernwein, Cedar Rapids, IA (US); Scott A. Sollars, Marion, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 630 days.

(21) Appl. No.: 16/665,824

(22) Filed: Oct. 28, 2019

(65) Prior Publication Data

US 2020/0055532 A1    Feb. 20, 2020

Related U.S. Application Data (63) Continuation-in-part of application No. 15/176,537, filed on Jun. 8, 2016, now Pat. No. 10,457,307, and
(Continued)

(51) Int. Cl.
| | | |
|---|---|---|
| *B61L 25/02* | (2006.01) | |
| *B60T 8/17* | (2006.01) | |
| *B61L 27/20* | (2022.01) | |

(52) U.S. Cl.
CPC .......... *B61L 25/021* (2013.01); *B60T 8/1705* (2013.01); *B61L 25/023* (2013.01); *B61L 25/028* (2013.01); *B61L 27/20* (2022.01)

(58) Field of Classification Search
CPC ........ B61L 29/32; B61L 29/22; B61L 25/021; B61L 25/025
See application file for complete search history.

(56) References Cited

U.S. PATENT DOCUMENTS 8,924,066 B2 * 12/2014 Fries ..................... B61L 25/021
701/19
9,026,360 B2 * 5/2015 Fries ...................... B61L 29/04
246/126
(Continued)

OTHER PUBLICATIONS

Official Letter for corresponding MX Application No. MX2016010702 dated Jan. 27, 2020.
(Continued)

*Primary Examiner* — Zachary L Kuhfuss
(74) *Attorney, Agent, or Firm* — Christopher R. Carroll; The Small Patent Law Group LLC (57) ABSTRACT

A system (e.g., a target activation system for a transportation network) includes one or more processors configured to be operably coupled onboard a vehicle system having one or more vehicles. The processor(s) are further configured to determine an estimated time of arrival of the vehicle system at a first target location associated with a forward route of the vehicle system, determine a gap time between when the vehicle system leaves the first target location and is estimated to arrive at a second target location, and, based at least in part on the estimated time of arrival, a dwell time of the vehicle system at the first target location, the gap time, an allowable speed or acceleration of the vehicle system, and a designated warning time, generate an activation message configured to control at least one device associated with the second target location.

17 Claims, 5 Drawing Sheets

Related U.S. Application Data a continuation-in-part of application No. 15/176,362, filed on Jun. 8, 2016, now Pat. No. 10,654,500.

(60) Provisional application No. 62/174,859, filed on Jun. 12, 2015.

(56) References Cited

U.S. PATENT DOCUMENTS

| | | | | |
|---|---|---|---|---|
| 9,126,609 | B2* | 9/2015 | Steffen, II | B61L 29/22 |
| 9,150,229 | B2* | 10/2015 | Steffen | B61L 29/32 |
| 10,457,307 | B2* | 10/2019 | Schultz | B61L 7/06 |
| 10,654,500 | B2* | 5/2020 | Schultz | B61L 3/008 |
| 2014/0346284 | A1* | 11/2014 | Fries | B61L 13/00 |
| | | | | 246/125 |
| 2016/0362123 | A1* | 12/2016 | Schultz | B61L 27/14 |
| 2017/0355388 | A1* | 12/2017 | Schultz | B61L 29/04 |
| 2020/0055532 | A1* | 2/2020 | Schultz | B61L 27/14 |

OTHER PUBLICATIONS

English translation of Official Letter for corresponding MX Application No. MX2016010702 dated Jan. 27, 2020.
Official Letter for corresponding MX Application No. MX/a/2016/007648 dated Aug. 25, 2020.
English translation of Official Letter for corresponding MX Application No. MX/a/2016/007648 dated Aug. 25, 2020.
Notice of Requisition by the Examiner dated Apr. 13, 2021 for corresponding Canadian Patent Application No. 2,932,752.

* cited by examiner

TARGET ACTIVATION SYSTEM FOR TRANSPORTATION NETWORK

CROSS-REFERENCE TO RELATED APPLICATIONS

This application is a continuation-in-part of U.S. patent application Ser. No. 15/176,537 filed 8 Jun. 2016 ("the '537 application"). This application is also a continuation-in-part of U.S. patent application Ser. No. 15/176,362 filed 8 Jun. 2016 ("the '362 application"), which claims priority to U.S. Provisional Application No. 62/174,859 filed 12 Jun. 2015 ("the '859 application"). The '537 application, the '362 application, and the '859 application are incorporated by reference herein in their entireties.

FIELD

Embodiments relate to vehicle control and movement. Other embodiments relate to control of equipment along a vehicle route, relative to vehicle movement.

BACKGROUND

Vehicle transportation networks exist throughout the world, and, at any point in time, a multitude of vehicles, such as cars, trucks, buses, trains, and the like, are travelling throughout the network. With specific reference to trains travelling in a track network, the locomotives of such trains may be equipped with or operated using train control, communication, and management systems (e.g., positive train control (PTC) systems), such as the I-ETMS® system of Wabtec Corp. In order to effectively manage train movement, navigation and enforcement systems and processes are implemented, both at the train level and the central dispatch level.

With respect to existing PTC systems and processes, a station stop that is located on an approach circuit can result in a crossing warning activation time that exceeds the minimum required Federal Railroad Administration (FRA) warning cycle, thereby causing long wait times for vehicular and pedestrian traffic. Contrary to conventional thought, a longer crossing activation cycle does not create a safer crossing. Excessive wait times can result in impatient drivers who may drive around the gates of the crossing instead of waiting for the train to pass. Therefore, it is desirable to reduce warning time for the sake of railroad efficiency and safety. Furthermore, existing PTC systems and processes cannot dynamically adjust to changes in train handling, and they are configured to use only a static station dwell time and a maximum crossing time. Moreover, existing PTC systems and processes do not employ a targeting methodology and, therefore, cannot prevent the train from arriving too early or too late to the crossing.

For at least these reasons, it may be desirable to provide a target activation system (e.g., system for activating equipment at a crossing) that differs from existing systems.

BRIEF DESCRIPTION

In an embodiment, a system (e.g., a target activation system for a transportation network) includes one or more processors configured to be operably coupled onboard a vehicle system having one or more vehicles. The processor(s) are further configured to determine an estimated time of arrival of the vehicle system at a first target location associated with a forward route of the vehicle system, determine a gap time between when the vehicle system leaves the first target location and is estimated to arrive at a second target location, and, based at least in part on the estimated time of arrival, a dwell time of the vehicle system at the first target location, the gap time, an allowable speed or acceleration of the vehicle system, and a designated warning time, generate an activation message configured to control at least one device (e.g., crossing notification device) associated with the second target location.

BRIEF DESCRIPTION OF THE DRAWINGS

Reference is now made briefly to the accompanying drawings, in which.

DETAILED DESCRIPTION

According to one aspect, a system (e.g., a target activation system for a transportation network) includes one or more processors (e.g., a controller or controllers) at least one of which is configured to be operably coupled onboard a vehicle system having one or more vehicles. For example, the vehicle system may include plural rail vehicles, or it may be one or more on-road or other vehicles. The processor(s) are further configured to determine an estimated time of arrival of the vehicle system at a first target location associated with a forward route of the vehicle system, determine a gap time between when the vehicle system leaves the first target location and is estimated to arrive at a second target location (along the forward route, the first target location is located before the second target location), and, based at least in part on the estimated time of arrival, a dwell time of the vehicle system at the first target location, the gap time, an allowable speed or acceleration of the vehicle system, and a designated warning time (e.g., designated by transportation network regulations), generate an activation message configured to control at least one device (e.g., crossing notification device) associated with the second target location.

In an embodiment, a target activation system for a vehicle system (e.g., train or other rail vehicle system) includes one or more processors configured to: receive at least one first target location associated with a forward route of the vehicle system; receive at least one second target location associated with the forward route of the vehicle system, wherein the at least one first target location is located before the at least one second target location on the forward route of the vehicle system; determine a gap time between when the vehicle system (e.g., a leading edge of the vehicle system, or a lead vehicle of the vehicle system, or the vehicle system generally) leaves the at least one first target location and is estimated to arrive at the at least one second target location based at least partially on a distance between the at least one first target location and the at least one second target location and a design speed; and based at least partially on the gap time, an allowable acceleration or speed of the vehicle system, and a designated warning time, generate an activation message configured to activate or cause the activation of at least one function (e.g., function of a device) associated with the at least one second target location.

In an embodiment, the activation message is generated after the vehicle system (e.g., the leading edge of the vehicle system) leaves the at least one first target location.

In an embodiment, the activation message is generated before the vehicle system (e.g., the leading edge of the vehicle system) leaves the at least one first target location.

In an embodiment, the one or more processors are configured to: determine an estimated time of arrival of the vehicle system (e.g., the leading edge of the vehicle system) at the at least one first target location based at least partially on the current location of the vehicle system (e.g., the leading edge of the vehicle system) and the current speed of the vehicle system; and based at least partially on the estimated time of arrival of the vehicle system (e.g., the leading edge of the vehicle system) at the at least one first target location, a dwell time of the vehicle system at the at least one first target location, the gap time, the allowable acceleration of the vehicle system, and the designated warning time, generate the activation message configured to activate or cause the activation of the function associated with the at least one second target location.

In an embodiment, the one or more processors are configured to automatically generate the activation message if the vehicle system (e.g., the leading edge of the vehicle system) leaves the at least one first target location at a time when a projected travel time of the vehicle system to arrive at the second target location, as a function of the allowable speed or acceleration, is less than the designated warning time.

In an embodiment, the one or more processors are configured to generate at least one inhibit message configured to inhibit or prevent, or cause the inhibition or prevention of, activation of the function of the at least one second target location.

In an embodiment, the one or more processors are configured to generate the inhibit message before the vehicle system (e.g., the leading edge of the vehicle system) arrives at at least one third target location, the at least one third target location located before the at least first target location and the at least one second target location on the forward route of the vehicle system.

In an embodiment, the design speed is a design speed associated with the at least one second target.

In an embodiment, the one or more processors are configured to: determine a required or designated time of arrival of the vehicle system (e.g., the leading edge of the vehicle system) at the at least one second target location based at least partially on the designated warning time; determine the estimated time of arrival of the vehicle system (e.g., the leading edge of the vehicle system) at the at least one second target location based at least partially on a location of the vehicle system (e.g., the leading edge of the vehicle system) and a speed of the vehicle system after the vehicle system (e.g., the leading edge of the vehicle system) leaves the at least one first target location; and based at least partially on the difference between the determined required time of arrival and the determined estimated time of arrival, generate a target speed of the vehicle system.

In an embodiment, if the distance between the at least one first target location and the at least one second target location is too short for the vehicle system to reach the design speed based on the allowable acceleration, the one or more processors are configured to reduce the design speed based on the allowable acceleration and the distance between the first target location and the second target location, e.g., set the design speed of the vehicle system to be equal to the square root of twice the product of the allowable acceleration and the distance between the at least one first target location and the at least one second target location.

In an embodiment, the at least one first target location includes a station stop signal and the at least one second target location includes a near side of an island crossing.

In an embodiment, the activation message includes a timestamp that indicates a time at which to activate the at least one function associated with the at least one second target location.

The target activation system described herein may be implemented in a variety of systems and vehicular networks. For illustration purposes, embodiments are described herein in the context of trains and other rail vehicle systems; said embodiments are applicable to vehicle systems more generally (e.g., a vehicle system may include one vehicle, or plural vehicles, e.g., mechanically or logically connected for coordinated travel along a route). For example, embodiments of the system can be implemented in conjunction with a train control and management system, e.g., the I-ETMS® system of Wabtec Corp. A rail vehicle system may include one or more locomotives or control cars (L) that make up a train (TR). It should be noted that multiple locomotives or control cars (L) may be included in the train (TR) to facilitate the reduction of the train (TR) to match with passenger (or some other) demand or requirement. Further, the methods and systems described herein can be used in connection with commuter trains, freight trains, and/or other train arrangements and systems. For example, a station stop signal or other reason for a train stop can be associated with a commuter rail station stop or for other railroad functions, such as crew changes.

In embodiments, the methods and systems described herein are used in connection with the locomotives or controls cars (L) that are positioned on each end of a train (TR), while in other embodiments or aspects, the methods and systems described herein are used in connection with locomotives or control cars that are positioned intermediately in the train (since these intermediate locomotives or control cars may eventually become a controlling locomotive or control car when the train is reconfigured). It is also noted that the methods and systems described herein may be used in connection with "electrical multiple unit" (EMU) or "diesel multiple unit" (DMU) configurations, where a locomotive does not technically exist, but multiple control cars would still be present. Still further, the train may include only one locomotive or control car and/or some or no railroad cars. Further, the method and systems described herein can be used in connection with commuter trains, freight trains, push-pull train configurations, and/or other train arrangements and systems. Still further, the train may be separated into different configurations and moved in either a first direction and/or a second direction. Any configuration or arrangement of locomotives, control cars, and/or railroad cars may be designated as a train or other rail vehicle consist/system. Still further, embodiments may be implemented on and/or used in connection with an auxiliary vehicle, such as an auxiliary railroad vehicle, a maintenance vehicle or machine, a road vehicle (e.g., a semi-truck trailer, pick-up truck, car, or other machine), a high-rail truck or other on-road vehicle equipped to ride on the rails of the track, and/or the like, or groups of such vehicles (for example, multiple such vehicles logically or mechanically coupled to travel together along a route).

As discussed hereinafter, the target activation system and method of the present invention may be implemented by, programmed or otherwise configured on, or otherwise associated with any type of processor or processors, such as one or more of the following: a specially-programmed computer, an on-board computer/controller 10 (as discussed hereinafter), a train management computer, a remote server, a back office server, a wayside device, a PTC component, a networked computer, or any combination thereof. Accordingly, some or all of the steps in the system, process, and method discussed hereinafter may be implemented and/or executed on-board a vehicle system (e.g., a locomotive or control car, and similarly, some or all of the steps in the system, process, and method discussed hereinafter may be implemented and/or executed by a processor or processors that are remote from the vehicle system, where the remote computer or processor(s) is in direct or indirect communication with a communication device 12 of the vehicle system.

Figure 1:
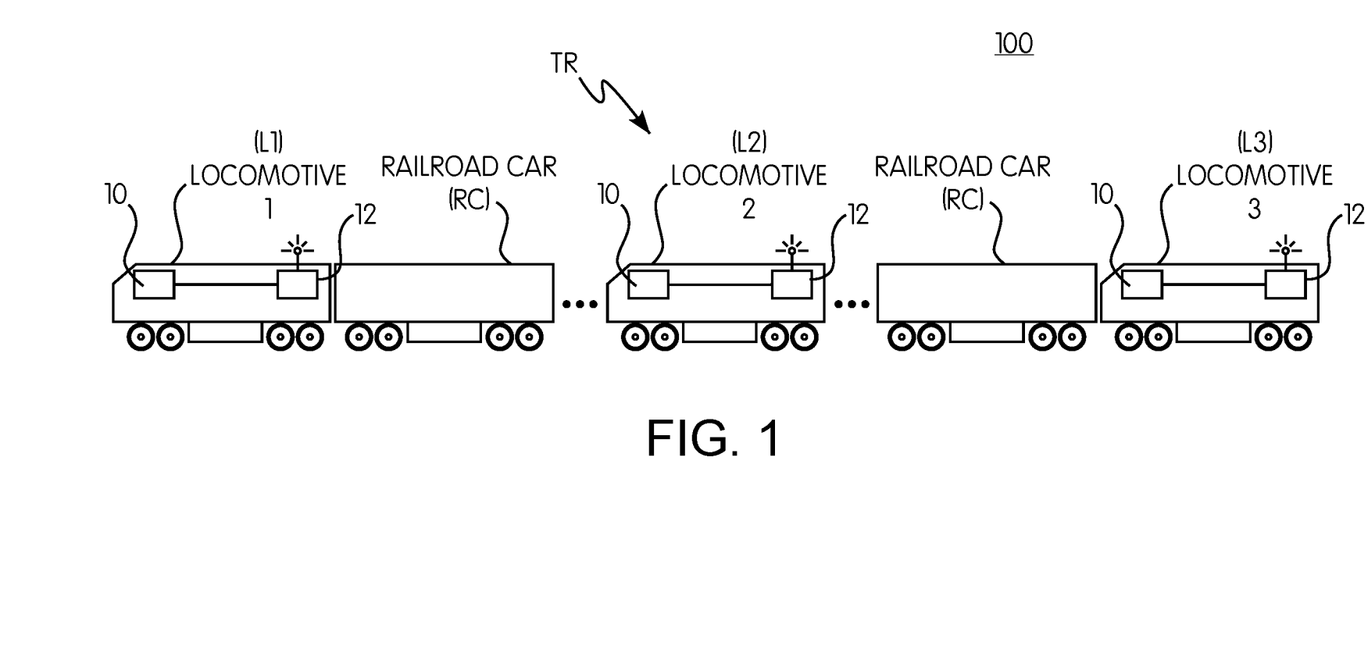
FIG. 1 is a schematic view of a vehicle control system, according to an embodiment of the invention.
Figure 2:
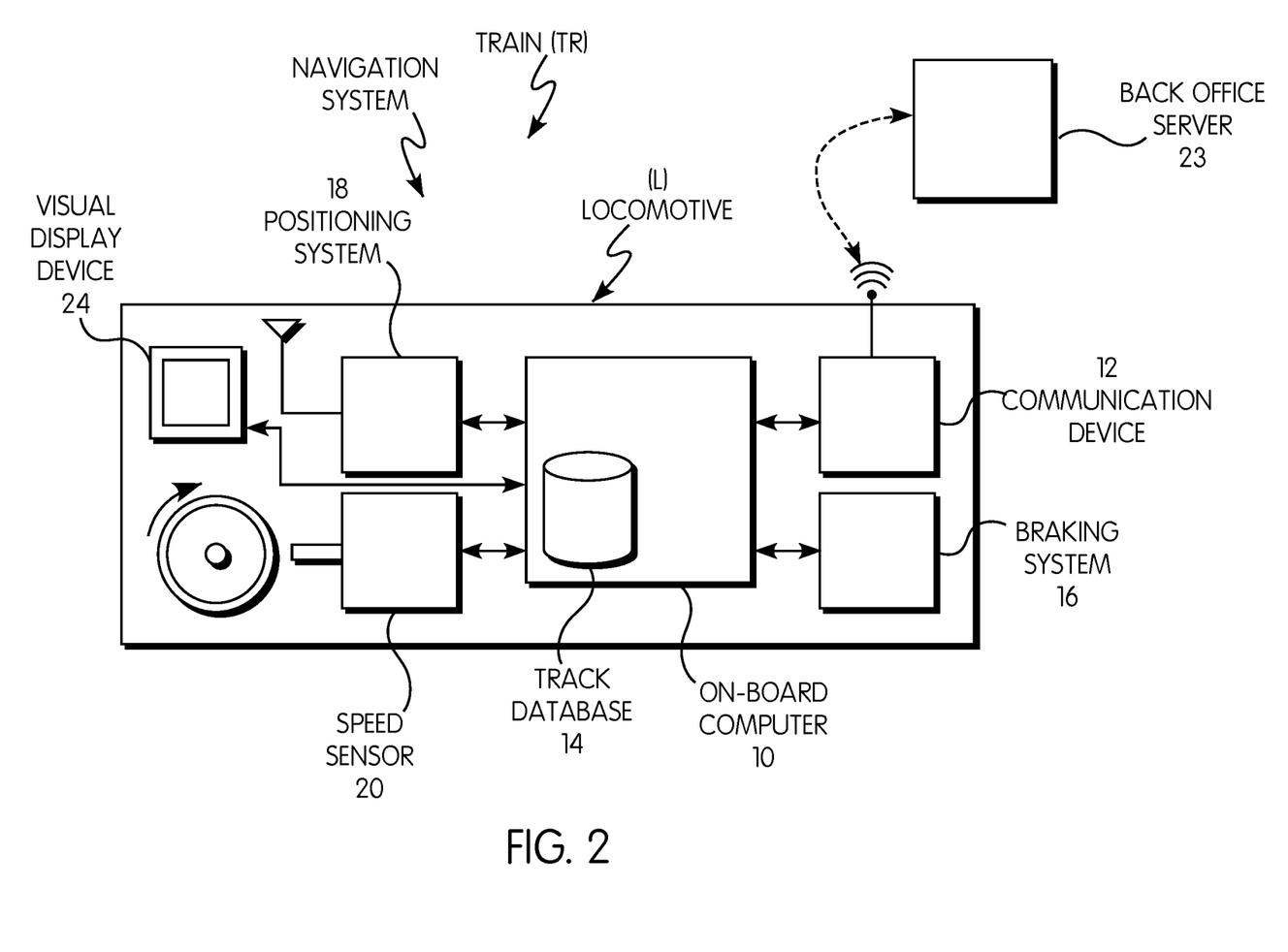
FIG. 2 is a schematic view of an embodiment of an arrival time and location targeting system.

With specific reference to FIGS. 1 and 2, and in an embodiment, provided is a target activation system (e.g., in one embodiment, a wireless system) for a vehicle system, e.g., a train (TR) including at least one locomotive or control car (L) and, optionally, one or more railcars (RC). For example, in one implementation, the train may include a plurality of locomotives (L1, L2, L3) and a plurality of rail cars. In another implementation, the train may include only a single locomotive and no rail cars or a plurality of rail cars. The locomotive(s) are equipped with at least an on-board processor 10 (e.g., an on-board controller, a train management computer, or other on-board processor-based electronics system) programmed or otherwise configured to implement or facilitate at least one train action, and a communication device 12 in communication with the on-board processor and programmed or otherwise configured to receive, transmit, and/or process data signals. While the communication device 12 may be in the form of a wireless communication device (as illustrated in FIG. 2), as discussed herein, this communication device 12 may also be programmed or otherwise configured to transmit, process, and/or receive signals over a trainline, using an ECP component, over the rails, and/or the like.

The system architecture used to support the functionality of at least some of the methods and systems described herein includes: the train management computer or other on-board processor 10 (which performs calculations for or within the PTC system, including navigation and enforcement calculations); the communication device 12 (e.g., a data radio) (which may be used to facilitate the communications between the on-board processor(s) 10 in one or more of the locomotives or control cars of a train, communications with a wayside device, e.g., signals, switch monitors, wayside devices, and the like, and/or communications with a remote server, e.g., a back office server 23, a central controller, or central dispatch); a track database 14 (which may include information about track positions or locations, switch locations, crossing locations, track heading changes, e.g., curves, distance measurements, train information, e.g., the number of locomotives or control cars, the number of railcars, the number of conventional passenger cars, the number of control cars, the total length of the train, the specific identification numbers of each locomotive or control car where PTC equipment (e.g., an on-board processor 10) is located, and the like); a navigation system 16 (optionally including a positioning system 18 (e.g., a Global Positioning System (GPS)) and/or a wheel tachometer/speed sensor 20), such as in a PTC-equipped locomotive or control car; and a visual display device 24 (or other operator interface), e.g., located in the locomotive or control car, which is in direct or indirect communication with the on-board processor 10 and provides information and data to the operator, such as the information, data, and/or screens as discussed hereinafter. It should also be recognized that some or all of the steps and processing described herein may be performed locally by the on-board processor 10 of the vehicle system (e.g., locomotive or control car), or alternatively, by another computer or other processor-based device (e.g., a computer associated with the end-of-train unit, a computer associated with a wayside device, and the like) and/or a remote computer or server (e.g., the back office server 23, a remote computer or server associated with central dispatch, a central controller, a computer-aided dispatch system, an intermediate control computer, or the like).

Further, the on-board processor 10 includes or is in communication with the communication device 12 (e.g., a data radio or other communication interface or component, and/or the like), which facilitates communication by or between locomotives or control cars and/or the locomotive or control car and a remote server or computer system, e.g., a central controller, a back office server 23, a remote server, central dispatch, back office PTC components, wayside devices, such as signal or switch monitors, or other on-board processors 10 in the railway system. Further, this communication may occur wirelessly or in a "hard wired" form, e.g., over the rails of the track.

As discussed, the on-board processor 10 may be located at any position or orientation on the vehicle system (e.g., train), and the on-board processor 10 (e.g., on-board controller, on-board computer system, train management computer, and/or the like, and which performs the determinations and/or calculations for the PTC system) includes or is in communication with the track database 14 populated with data and/or which receives specified data and information from other vehicles (e.g., trains), back office or other remote servers, central dispatch, and/or the like, where this data may include track profile data, train data, information about switch locations, track heading changes (e.g., curves, and distance measurements), train consist information (e.g., the number of locomotives, the number of cars, the total length of the train, and/or the like), and/or the like. It is envisioned that any type of train management system can be used within the context and scope of the present invention.

A target activation system and controller/processor-implemented method as described herein may be implemented as part of or incorporate an arrival time and location targeting system as disclosed in the aforementioned U.S. patent application Ser. No. 15/176,362 filed 8 Jun. 2016. For example, as described in more detail below, the on-board processor may employ features and aspects of the arrival time and location targeting system including time-based targeting to ensure that the train or other vehicle system does not violate designated warning times.

Figure 3:
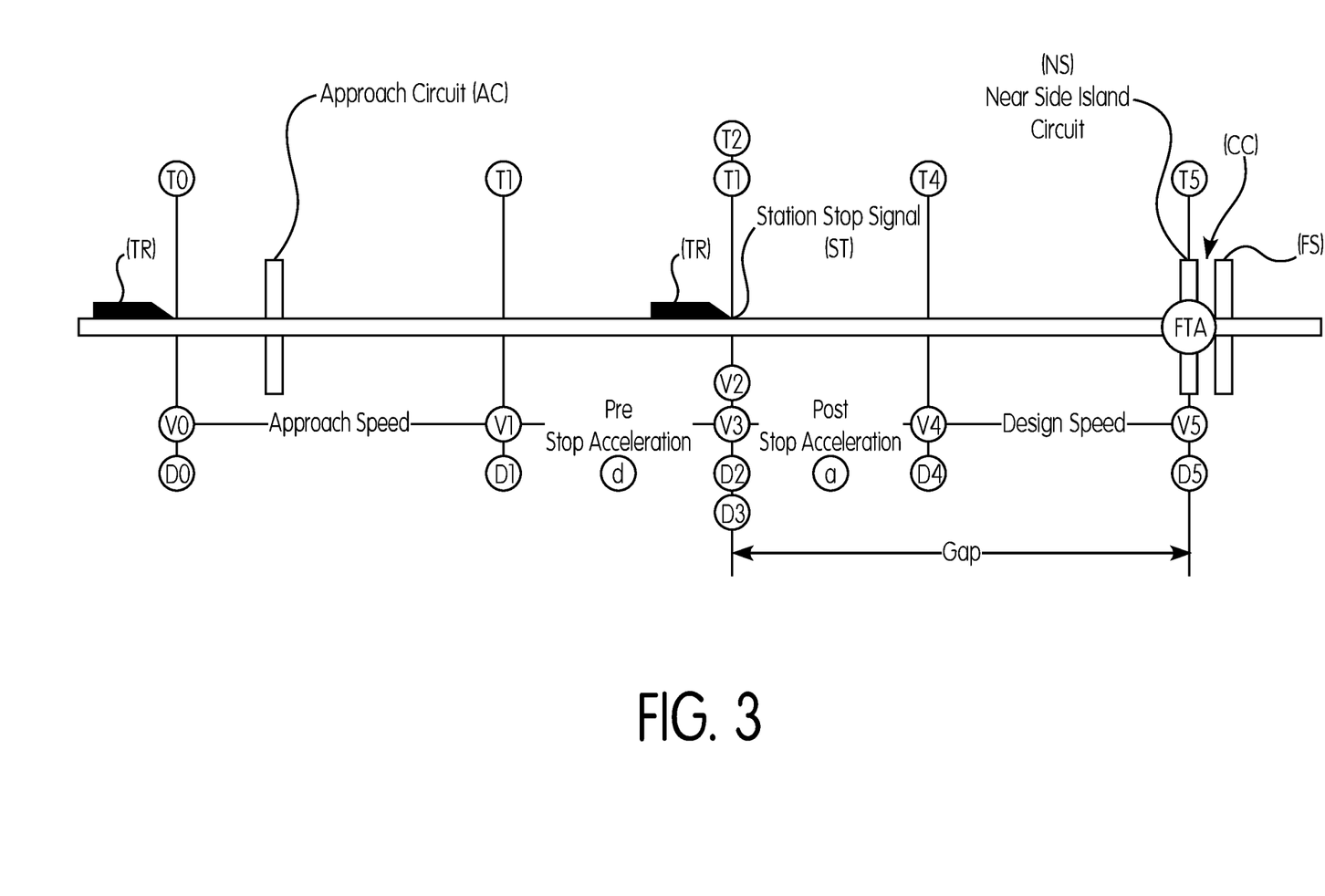
FIG. 3 is a schematic view of another embodiment of an arrival time and location targeting system.

In one embodiment, one or more processors (e.g., the on-board processor 10 and/or a remote processor or server, e.g., the back office server 23) are programmed or otherwise configured to receive information about at least one first target location associated with a forward route of a train (TR) or other vehicle system, e.g., a station stop signal (ST) as shown in FIG. 3, and at least one second target location associated with the forward route of the train or other vehicle system, e.g., a near side (NS) of an island crossing circuit (CC) as shown in FIG. 3. The at least one first target location is located before the at least one second target location on the forward route of the train. For example, as shown in FIG. 3, the station stop signal is located between a leading edge of the train and the near side of the island crossing circuit.

FIG. 3 represents two points in time, namely a present point in time, i.e., Point A, and a future point in time, i.e., Point B, overlaid on a piece of track with an approach circuit (AC) and the island crossing circuit (CC) including the near side island circuit (NS) and a far side island circuit (FS). In FIG. 3, the variable indices 0, 1 & 2 are used for Point A in time and the variable indices 3, 4 & 5 are used for Point B in time. Point A in time represents a time, a location and a velocity or speed of the leading edge of the train (TR) at a starting point (0), a starting point of deceleration of the train as the train approaches the at least one first target location (1), e.g., a point before the station stop signal (ST), and a point at which the leading edge of the train stops or is stopped at the at least one first target location (2), e.g., at the station stop signal. Point B in time represents a time, a location, and a velocity or speed of the leading edge of the train at a point that the train leaves or is leaving the at least one first target (3), e.g., the station stop signal, an ending point of an acceleration of the train after leaving the at least one first target (4), e.g., after the station stop signal, and a point at which the leading edge of the train reaches or arrives at the at least one second target (5), e.g., the near side of the island circuit crossing.

The one or more processors (e.g., the on-board processor 10 and/or a remote processor or server, e.g., the back office server 23), for example, as part of calculations for or within the PTC system, knows or receives information of the following variables: a velocity or speed of the train (TR) at points (0) and (1), which is equal to a current speed of the train, i.e., V0=V1=current speed of the train; a velocity or speed of the train at points (2) and (3), which is equal to 0 (zero) because the train is stopped at the station stop signal (ST), i.e., V2=V3=0; a velocity or speed of the train at points (4) and (5), which is equal to a design speed of the island crossing circuit (CC), i.e., V4=V5=design speed; a distance of the leading edge of the train to the station stop signal (ST) at points (2) and (3) is the same, i.e., D2=D3=distance of the leading edge of the train to the station stop signal; a distance of the leading edge of the train to the near side (NS) of the island crossing circuit, i.e., D5; an allowable acceleration, which may include positive and/or negative changes in velocity, e.g., d=deceleration (negative value) and a=acceleration (positive value). The design speed can be a design speed associated with the at least one second target location, e.g., a desired speed at which the train should traverse the island circuit crossing. The allowable acceleration and the allowable deceleration may be maximum values, for example, set by the PTC system, that limit the acceleration and the deceleration of the train to a maximum acceleration and a maximum deceleration. For example, the on-board processor (and/or a remote processor or server, e.g., the back office server) can prevent the train from performing braking or tractive efforts that the on-board processor determines would results in an unacceptable acceleration or deceleration of the train.

The one or more processors (e.g., the on-board processor and/or a remote processor or server, e.g., the back office server) can use the following Equations (1)-(3) to model the present point in time, Point A:

$$V2 = V0 + d(T2 - T1) \quad (1)$$

$$D1 - D0 = V0(T1 - T0) \quad (2)$$

$$D2 - D1 = V1(T2 - T1) + d\frac{(T2 - T1)^2}{2} \quad (3)$$

wherein, based on the Point A in time, T0=0; D0=0 and, where D1 is a distance of the leading edge of the train (TR) to the station stop signal (ST) at point (1), e.g., a point at which the train begins pre-stop deceleration.

The on-board processor (and/or a remote processor or server, e.g., the back office server) can use the following Equations (4)-(6) to model the future point in time, Point B:

$$V4 = V3 + a(T4 - T3) \quad (4)$$

$$D5 - D4 = V5(T5 - T4) \quad (5)$$

$$D4 - D3 = V3(T4 - T3) + a\frac{(T4 - T3)^2}{2} \quad (6)$$

where D4 is a distance of the leading edge of the train (TR) to the near side (NS) of the island circuit crossing (CC) at point (4), e.g. a point at which the velocity or speed of the train reaches the design speed.

The on-board processor (and/or a remote processor or server, e.g., the back office server) can determine an estimated time of arrival (ETA) of the leading edge of the train (TR) at the at least one first target location based at least partially on the current location of the leading edge of the train and the velocity or current speed of the train. For example, the on-board processor (and/or a remote processor or server, e.g., the back office server) can determine an estimated time until (or at which) the leading edge of the train reaches the station stop signal (ST). As noted, based on the Point A in time, T0=0 and D0=0, and Equations (1) and (2) can thus be reduced to the following Equations (7) and (8):

$$0 = V0 + d(T2 - T1) \quad (7)$$

$$D1 = V0 * T1 \quad (8)$$

Equations (7) and (8) can be used to solve for (T2-T1) to arrive at the following Equation (9):

$$(T2 - T1) = \frac{-V0}{d} \quad (9)$$

Substitution of the value for (T2-T1) in Equation (9) into Equation (3) can reduce Equation (3) to the following Equation (10):

$$D2 - D1 = V1\left(\frac{-V0}{d}\right) + d\frac{\left(\frac{-V0}{d}\right)^2}{2} \quad (10)$$

Equation (10) can be further simplified to the following Equation (11):

$$D1 = D2 + \frac{V0^2}{2d} \quad (11)$$

Equations (8) and (7) can be rearranged as the following Equation (12) and (13):

$$T1 = \frac{D1}{V0} \quad (12)$$

$$T2 = \frac{-V0}{d} - T1 \quad (13)$$

Equation (12) can be substituted into Equation (13) to arrive at the following Equation (14):

$$T2 = \frac{-V0}{d} - \frac{D1}{V0} \quad (14)$$

Further substitutions for D1 and further simplification of Equation (14) can provide the following Equation (15):

$$T2 = \frac{D2}{V0} - \frac{V0}{2d} \quad (15)$$

wherein T2=an estimated time of arrival (ETA) of the leading edge of the train (TR) at the station stop signal (ST); V0=a current velocity or speed of the train; and D2=a distance of the leading edge of the train to the station stop signal. The on-board processor 10 (and/or a remote processor or server, e.g., the back office server 23) can thus determine the ETA of the leading edge of the train at the station stop signal based on a current distance of the leading edge of the train to the station stop signal, a current velocity or speed of the train, and an allowable deceleration of the train.

The on-board processor (and/or a remote processor or server, e.g., the back office server) can determine a gap time between when the leading edge of the train (TR) leaves the at least one first target location and is estimated to arrive at the at least one second target location based at least partially on a distance between the at least one first target location and the at least one second target location and a design speed of the train. For example, the on-board processor (and/or a remote processor or server, e.g., the back office server) can determine a gap time between when the leading edge of the train leaves or is leaving the station stop signal (ST) and is estimated to arrive at the near side (NS) of the island circuit crossing (CC) based at least partially on a distance between the station stop signal and the near side of the island circuit crossing and a target or design speed of the train. Based on the Point B in time, the following variables are known: T3=0 and D3=0. As previously noted, V3=0. Equations (4), (5), and (6) used to model the Point B in time, and the Equations (4) and (6) can be reduced to the following Equations (16) and (17):

$$V4 = a * T4 \quad (16)$$

$$D4 = a\frac{T4^2}{2} \quad (17)$$

Equation (16) can be solved for T4, and V5 can be substituted for V4 therein to arrive at the following Equation (18):

$$T4 = \frac{V5}{a} \quad (18)$$

The value of T4 in Equation (18) can be substituted into Equation (17) to arrive at the following Equation (19):

$$D4 = a\frac{\left(\frac{V5}{a}\right)^2}{2} \quad (19)$$

which can be simplified to the following Equation (20):

$$D4 = \frac{V5^2}{2a} \quad (20)$$

The value of D4 in the Equation (20) can be substituted into Equation (5) to arrive at the following Equation (21):

$$D5 - \frac{V5^2}{2*a} = V5\left(T5 - \frac{V5}{a}\right) \quad (21)$$

Equation (21) can be rearranged and simplified in the following manner as shown by Equations (22) to (25) to arrive at the Equation (26):

$$D5 - \frac{V5^2}{2*a} = V5*T5 - \frac{V5^2}{a} \quad (22)$$

$$D5 = V5*T5 - \frac{V5^2}{a} + \frac{V5^2}{2*a} \quad (23)$$

$$D5 = V5*T5 - \frac{V5^2}{2*a} \quad (24)$$

$$V5*T5 = D5 + \frac{V5^2}{2*a} \quad (25)$$

$$T5 = \frac{D5}{V5} + \frac{V5}{2*a} \quad (26)$$

wherein T5=the gap time; V5=the design speed; and a=the allowable acceleration. Because D3 was assumed to be 0 (zero) to solve for the Equation (21), D5 represents the gap distance between the station stop signal (ST) and the near side (NS) of the island crossing circuit (CC). The on-board processor 10 (and/or a remote processor or server, e.g., the back office server 23) can thus determine the gap time, i.e., the time it takes the train (TR) to traverse the gap between the station stop signal and the near side of the island crossing circuit based on the gap distance, the design speed, and the allowable acceleration. It should be noted, however, that if the distance between the at least one first target location and the at least one second target location is too short to reach the design speed based on the allowable acceleration, the on-board processor (and/or a remote processor or server, e.g., the back office server) is programmed or otherwise configured to set the design speed of the train to be $$\sqrt{2*a*gd},$$

where a is the allowable acceleration and gd is the distance between the at least one first target location and the at least one second target location. For example, if the gap distance is too short for the train to reach the design speed, the velocity or speed of the train at the crossing, i.e., V5, is based on the following Equation (27):

$$V5 = \sqrt{2*a*D5} \qquad (27)$$

where V5 is the velocity or speed of the train at the crossing, a is the allowable acceleration, and D5 is the gap distance. The on-board processor (and/or a remote processor or server, e.g., the back office server) can use this speed instead of the design speed to calculate the gap time if it determines that the gap distance is too short for the train to reach the design speed.

The on-board computer generates an activation message configured to activate a function associated with the at least one second target location based at least partially on the estimated time of arrival of the leading edge of the train (TR) at the at least one first target location, a dwell time of the leading edge of the train at the at least one first target location, the gap time, an allowable acceleration of the train, and a designated warning time. For example, the activation message may include a timestamp that indicates a time at which to activate the at least one function associated with the at least one second target location, e.g., a time to activate the wireless crossing circuit (CC) gates and/or warning notifications. The communications device 12 can transmit the activation message to the wireless crossing circuit itself, or to the back office server 23 or other PTC component configured to control the functions of the wireless crossing circuit. In another implementation, the activation message may be configured to activate the at least one function of the at least one second target location immediately upon its receipt. For example, the on-board processor (and/or a remote processor or server, e.g., the back office server) may control the communications device 12 to transmit the activation message to the wireless crossing circuit at the time to activate the at least one function of the at least one second target location to immediately trigger the activation of the wireless crossing circuit upon its receipt thereby. The dwell time may be a time period during which the train is supposed to or instructed to remain stopped at the station stop signal (ST). For example, the station stop signal can have a desired or preset time period associated therewith or a dynamic time period set based on time of day or other factors that influence train operations that indicates to the on-board processor (and/or a remote processor or server, e.g., the back office server) and/or the operator of the train a time at which the train can leave the station stop signal.

The on-board processor 10 (and/or a remote processor or server, e.g., the back office server 23) can calculate the ETA of the leading edge of the train (TR) to the near side (NS) of the island crossing circuit (CC) based on the ETA of the leading edge of the train to the station stop signal (ST), a dwell time of the train at the station stop signal, the gap time of the train, and the allowable acceleration of the train. For example, a time to crossing=time to station+dwell time+gap time-allowable acceleration. The on-board processor 10 (and/or a remote processor or server, e.g., the back office server 23) can adjust for a designated warning time, e.g., a maximum crossing time associated with the island crossing circuit. For example, a station release timestamp=a current timestamp+(time to crossing-designated warning time). The calculated station release timestamp may be used for a situation where the train adheres to an associated schedule of stopping at the station stop signal and dwelling at the station for the appropriate or predetermined amount of time. However, if the train does not stop at the station stop signal or does not dwell at the station for the appropriate or predetermined amount of time, the on-board processor (and/or a remote processor or server, e.g., the back office server) can perform one or more operations to ensure that the designated warning time and the allowable acceleration are still enforced.

In one embodiment, the on-board processor 10 (and/or a remote processor or server, e.g., the back office server 23) can be programmed or otherwise configured to determine required time of arrival of the leading edge of the train (TR) at the at least one second target location based at least partially on the designated warning time and determine the estimated time of arrival of the leading edge of the train at the at least one second target location based at least partially on a location of the leading edge of the train and a velocity or speed of the train after the leading edge of the train leaves the at least one first target location. The on-board processor (and/or a remote processor or server, e.g., the back office server) can generate a target speed of the train based at least partially on the difference between the determined required time of arrival and the determined estimated time of arrival. For example, as disclosed in U.S. patent application Ser. No. 15/176,362, the on-board processor (and/or a remote processor or server, e.g., the back office server) can determine the required acceleration (or deceleration) time to generate the target speed of the train to meet the required time of arrival, i.e., to arrive at the near side (NS) of the island crossing circuit (CC) substantially at the moment that the designated warning time is satisfied. The on-board processor (and/or a remote processor or server, e.g., the back office server) can use the target speed of the train in place of the design speed to ensure that the train does not violate the designated warning time by arriving at the near side of the island crossing circuit too early or too late.

In one embodiment, the on-board processor 10 (and/or a remote processor or server, e.g., the back office server 23) can generate and/or send the activation message after the leading edge of the train (TR) leaves the at least one first target location, e.g., after the leading edge of the train leaves the station stop signal (ST). The on-board processor (and/or a remote processor or server, e.g., the back office server) calculates the gap time as a fixed amount of time that assumes some degree of "normalcy" in train operations, e.g., the train stops at the station stop signal and remains at the station stop signal for the appropriate amount of dwell time, but errs on the side of caution. The gap time can be used to divide the station release logic into two parts, pre-station stop and post station stop. If the on-board processor (and/or a remote processor or server, e.g., the back office server) determines that the gap time plus the allowable acceleration is greater than the designated warning time, e.g., a maximum crossing time of the island crossing, the on-board processor can generate the activation message after the station stop or post-station. For example, the activation message can include a timestamp to activate the wireless crossing circuit or, be generated and transmitted, after the leading edge of the train leaves the station stop signal. For example, the on-board processor can generate a station release message configured to activate the wireless crossing after the leading edge of the train leaves the station stop signal. The on-board processor can determine a timestamp (or transmit time) for the post station stop activation message, e.g., an amount of time after the leading edge of the train leaves the station stop signal that the timestamp in the activation message indicates to activate the wireless crossing (or an amount of time after the leading edge of the train leaves the station stop signal that the activation message should be sent) based on the gap time, the designated warning time, and the allowable acceleration. For example, the on-board processor can determine the release time after the station stop signal as equal to the following: gap time−(designated warning time+allowable acceleration), and the station release timestamp=left station timestamp+the release time after the station stop.

In one embodiment, the on-board processor 10 (and/or a remote processor or server, e.g., the back office server 23) can generate or send the activation message before the leading edge of the train leaves the at least one first target location. If the on-board processor determines that a post station stop release scenario is not appropriate or expected, for example, the on-board processor determines that the gap time plus the allowable acceleration is greater than the designated warning time, e.g., a maximum crossing time of the island crossing, the on-board processor can determine that a pre-station stop release is needed. The on-board processor can include the dwell time in the pre-station stop. For example, a pre-station release can be any release that occurs prior to the leading edge of the train (TR) leaving the station stop. For pre-station stop releases, the on-board processor can calculate the ETA of the leading edge of the train to the crossing based on the ETA of the leading edge of the train to the station stop signal, a dwell time of the train at the station stop signal, gap time of the train, and the allowable acceleration of the train, e.g., using Equation (26)

Accordingly, the on-board processor 10 (and/or a remote processor or server, e.g., the back office server 23) can enforce the designated warning time plus the allowable acceleration from the time a station release message is sent regardless of whether a post station stop release, a positive pre-station stop release, or a negative pre-station stop release scenario occurs for the train. A target activation system according to an embodiment can thus mitigate variances from normal conditions that may occur when the train is traversing the crossing approach and island crossing circuits.

Examples in which the above equations are used to determine a time to activate a wireless crossing located after a station stop signal on a forward route of a train are shown in the following table. Table 1 shows results for a crossing with a 7000 foot approach where a location of the station stop signal (ST) along the approach is varied. The table reflects how different locations of the station stop signal changes the scenario based on gap time. In the examples shown in the following table, the following variables are used: acceleration=1.6 $mph/s^2$ or 2.35 $fps/s^2$; deceleration=−3 $mph/s^2$ or −4.40 $fps/s^2$; design speed=65 mph or 95.33 fps; dwell time=20 s; maximum crossing time=42 s; and D5−D0=7000 ft. A time buffer that allows for some increase in speed without violating the desired crossing time can be designated as 6 seconds, for example.

TABLE 1

| V0 (mph) | V0 (fps) | D2 − D0 (ft) | Time to Station Stop T2 (sec) | Time to Station Departure T3 (sec) | Gap Distance D5 − D3 (ft) | Max Speed at Crossing from Gap (fps) | Gap Time Max Speed < Design Speed (sec) | Gap Time Max Speed > Design Speed (sec) | Gap Time T5 (sec) | Time to Crossing (sec) | Relative Time to Release (sec) | Pre or Post Station Release |
|---|---|---|---|---|---|---|---|---|---|---|---|---|
| 63 | 92.4 | 6500 | 80.85 | 100.85 | 500 | 48.44 | <u>20.64</u> | 25.56 | <u>20.64</u> | 121.49 | 73.49 | Pre |
| 63 | 92.4 | 6000 | 75.44 | 95.44 | 1000 | 68.51 | <u>29.19</u> | 30.80 | <u>29.19</u> | 124.63 | 76.63 | Pre |
| 63 | 92.4 | 5500 | 70.02 | 90.02 | 1500 | 83.90 | <u>35.75</u> | 36.05 | <u>35.75</u> | 125.78 | 77.78 | Pre |
| 63 | 92.4 | 5000 | 64.61 | 84.61 | 2000 | 96.88 | 41.29 | 41.29 | 41.29 | 125.90 | 77.90 | Pre |
| 63 | 92.4 | 4500 | 59.20 | 79.20 | 2500 | 108.32 | 46.16 | *46.54* | *46.54* | 125.74 | 77.74 | Pre |
| 63 | 92.4 | 4000 | 53.79 | 73.79 | 3000 | 118.66 | 50.56 | *51.78* | *51.78* | 125.57 | 77.57 | Post |
| 63 | 92.4 | 3500 | 48.38 | 68.38 | 3500 | 128.17 | 54.62 | *57.03* | *57.03* | 125.40 | 77.40 | Post |
| 63 | 92.4 | 3000 | 42.97 | 62.97 | 4000 | 137.02 | 58.39 | *62.27* | *62.27* | 125.24 | 77.24 | Post |

(and, if needed, Equation (27)). For example, as noted, the on-board processor can determine a time to crossing of the leading edge of the train as equal to the following: a time to station+Dwell Time+Gap Time−Allowable Acceleration. The on-board processor can adjust for a designated warning time, e.g., a maximum crossing time associated with the island crossing. For example, the activation message can include a station release timestamp having a timestamp=a current timestamp+(time to crossing−designated warning time).

In one embodiment, the on-board processor 10 (and/or a remote processor or server, e.g., the back office server 23) is programmed or otherwise configured to automatically generate the activation message if the leading edge of the train (TR) leaves the at least one first target location at a time when a summation of the gap time and the allowable acceleration is less than the designated warning time. For example, if a pre-station stop condition is expected, but fails to happen due to either the train not stopping at the station stop signal (ST) or the train leaving the station earlier than expected, (e.g., the train leaves the station without a station release message occurring when the on-board processor has determined that a pre-station stop release is needed), the on-board processor can automatically generate and transmit the activation message immediately after the leading edge of the train leaves the station stop signal.

The bolded, underlined values and the bolded, italicized values represent whether gap time was determined based on design speed or, if the gap distance is too short for the train (TR) to reach the design speed, based on Equation (27). The column labeled "Gap Time Max Speed<Design Speed" shows the time to traverse the gap under constant acceleration, i.e., V5 from equation (27) plugged back into Equation (26). The column labeled "Gap Time Max Speed>Design Speed" shows results of Equation (26) with V5=design speed. The column labeled "Gap Time T5" is the end result of which gap time the onboard processor 10 determines should be used. For example, if second gap time, i.e., Gap Time Max Speed>Design Speed, is greater than the first, the onboard processor 10 uses the first gap time. As can be seen in Table 1, when a calculated time to release is greater than the departure time of the station, the onboard processor can determine a pre-station departure release verses a post-station departure release.

In another embodiment, the on-board processor 10 (and/or a remote processor or server, e.g., the back office server 23) can be configured to generate a message configured to activate at least one crossing associated with a forward route of the train in response to actuation of at least one locomotive control. For example, an operator of the train (TR) can activate the automatic crossing activation function of the island crossing circuit (CC) manually by pushing a button in the locomotive. The button can be a physical button or button displayed on a touchscreen provided in the operator interface 24.

Figure 4A:
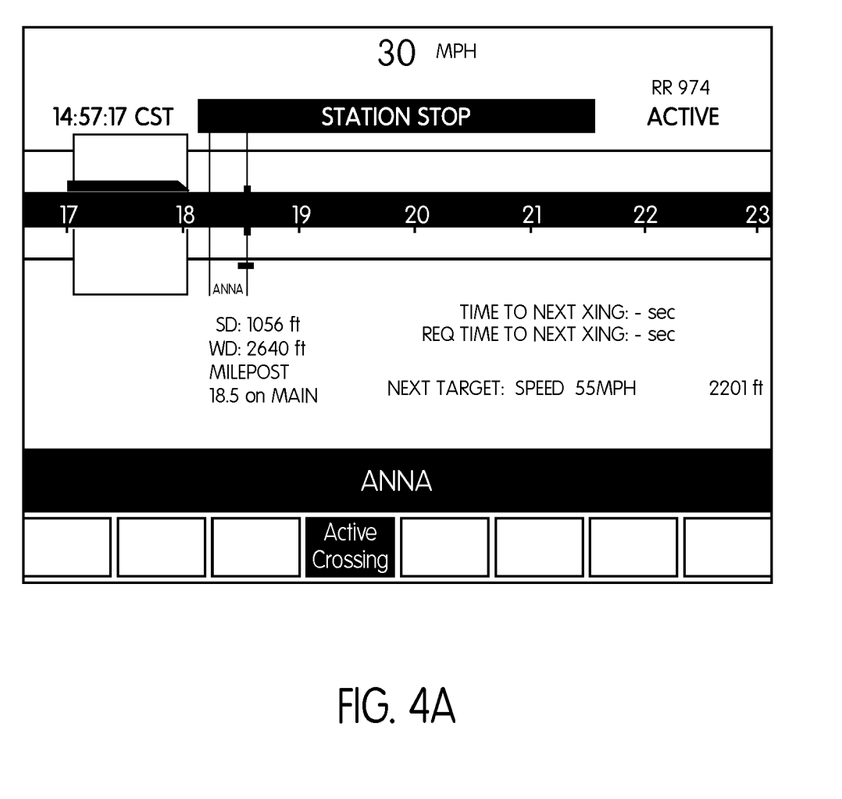
FIG. 4A is an example of a graphical representation of an operator interface of an activation system, according to one embodiment.
Figure 4B:
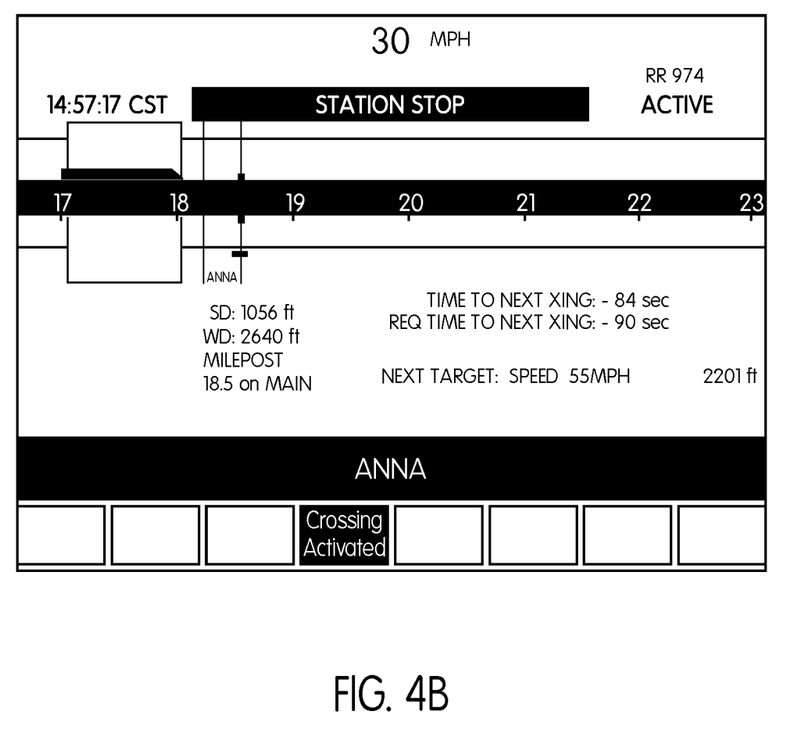
FIG. 4B is another example of a graphical representation of an operator interface of an activation system, according to another embodiment.

FIGS. 4A and 4B show an example graphical representation of an operator interface of wireless activation system. Under certain conditions, it may be desirable for the operator of the train (TR) to override an automatic crossing activation function and start the crossing manually. The operator interface 24 can provide the operator with an option of selecting an "Activate Crossing" button that controls the on-board processor and communications device 12 to generate and send an activation message to the wireless crossing circuit (CC) (or to the back office server 23 or other PTC component configured to control the functions of the wireless crossing circuit) to activate the wireless crossing.

In one implementation, the on-board processor 10 (and/or a remote processor or server, e.g., the back office server 23) can be programmed or otherwise configured to enable actuation of the at least one locomotive control based on at least one of a location of the leading edge of the train (TR) and a speed of the train. In another implementation, the on-board processor 10 (and/or a remote processor or server, e.g., the back office server 23) can be programmed or otherwise configured to enable actuation of the at least one locomotive control in response to a message received from a station stop signal (ST) located in advance of the crossing circuit (CC) on the forward route of the train. For example, the availability of the "Activate Crossing" button can be on a station by station basis. Stations that are configured to use the crossing activation button can enable display of the button when the train has reached the station and the wheel tach speed of the train is below a tolerance that indicates that the train has stopped. For example, as shown in FIG. 4A, the "Activate Crossing" button is not enabled, which is indicated by a yellow background. In FIG. 4B, the "Activate Crossing" button is enabled, which is indicated by a green button. After the button is pressed by the operator and activation of the crossing is confirmed, the operator interface 24 can indicate that the crossing has activated and the train is allowed to proceed.

Embodiments of the invention relate generally to vehicle systems and control processes, such as railway systems including trains travelling in a track or rail network, and in particular to a target activation system and method that may be used in connection with navigation in railway networks, such as in connection with railway networks that include target locations (e.g., a crossing, a safety target, a track section, a track location, a restricted speed location, a circuit, a restricted noise location, or another designated or specified location, or the like).

As used herein, "positive vehicle control" refers to vehicle control where vehicle movement (e.g., from a stopped position) is predicated on receipt of a designated signal under designated conditions; if the signal is not received or ceases being received, the vehicle is automatically controlled to a stopped condition (or other designated condition) or, if stopped, is prevented from moving. A contrary example is negative vehicle control, where a vehicle is free to move unless it receives a designated signal, such as a stop order. PTC refers to a positive vehicle control system specifically implemented for trains or other rail vehicle systems.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hard-wired (e.g., over the rails of a track, over a trainline extending between railcars of a train, and the like)) between two units, such as two locomotive units or control cars. In an embodiment, the "communication device" is a radio transceiver programmed, configured, or adapted to wirelessly transmit and receive radio frequency signals and data over a radio signal communication path.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. The terms "including" and "in which" are used as the plain-English equivalents of the respective terms "comprising" and "wherein." The terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
one or more processors configured to be operably coupled onboard a vehicle system having one or more vehicles, wherein the one or more processors are further configured to:
determine an estimated time of arrival of the vehicle system at a first target location associated with a forward route of the vehicle system, based at least in part on a current location of the vehicle system and a current speed of the vehicle system;
determine a gap time between when the vehicle system leaves the first target location and is estimated to arrive at a second target location based at least in part on a distance between the first target location and the second target location and a design speed, wherein the first target location is located before the second target location on the forward route of the vehicle system; and
based at least in part on the estimated time of arrival, a dwell time of the vehicle system at the first target location, the gap time, an allowable speed or acceleration of the vehicle system, and a designated warning time, generate an activation message configured to control at least one device associated with the second target location, wherein the one or more processors are further configured to:
determine a required time of arrival of a leading edge of the vehicle system at the second target location based at least partially on the designated warning time;
determine the estimated time of arrival of the leading edge of the vehicle system at the second target location based at least partially on a location of the leading edge of the vehicle system and a speed of the vehicle system after the leading edge of the vehicle system leaves the first target location; and
based at least partially on a difference between the required time that is determined of arrival and the estimated time that is determined of arrival, generate a target speed of the vehicle system.

2. The system of claim 1, wherein the one or more processors are further configured, responsive to when the distance between the first target location and the second target location is too short for the vehicle system, based on the allowable acceleration, to achieve the design speed by when a vehicle reaches the second target location, to reduce the design speed based on the allowable acceleration and the distance between the first target location and the second target location.

3. The system of claim 1, wherein the one or more processors are configured to generate the activation message after the vehicle system leaves the first target location.

4. The system of claim 1, wherein the one or more processors are configured to generate the activation message before the vehicle system leaves the first target location.

5. The system of claim 1, wherein the one or more processors are configured to automatically generate the activation message if the vehicle system leaves the first target location at a time when a projected travel time of the vehicle system to arrive at the second target location, as a function of the allowable speed or acceleration, is less than the designated warning time.

6. The system of claim 1, wherein the one or more processors are configured to generate at least one inhibit message configured to inhibit or prevent, or cause an inhibition or prevention of, activation of the at least one device associated with the second target location.

7. The system of claim 1, wherein the one or more processors are configured to generate an inhibit message before the vehicle system arrives at a third target location, the third target location located before the first target location and the second target location on the forward route of the vehicle system.

8. The system of claim 1, wherein the design speed is a design speed associated with the second target location.

9. The system of claim 1, wherein the first target location comprises a station stop signal and the second target location comprises a near side of an island crossing.

10. The system of claim 1, wherein the activation message comprises a timestamp that indicates a time at which to activate the device associated with the second target location.

11. The system of claim 1, wherein the second target location is a crossing of where other vehicles may cross the forward route of the vehicle system, and the at least one device comprises a notification device located at the crossing.

12. A system comprising:
one or more processors configured to be operably coupled onboard a vehicle system having one or more vehicles, wherein the one or more processors are further configured to:
determine an estimated time of arrival of a leading edge or lead vehicle of the vehicle system at a first target location associated with a forward route of the vehicle system, based at least partially on a current location of the leading edge or lead vehicle of the vehicle system and a current speed of the vehicle system;
determine a gap time between when the leading edge or lead vehicle of the vehicle system leaves the first target location and is estimated to arrive at a second target location based at least partially on a distance between the first target location and the second target location and a design speed, wherein the first target location is located before the second target location on the forward route of the vehicle system; and
based at least partially on the estimated time of arrival, a dwell time of the leading edge or lead vehicle of the vehicle system at the first target location, the gap time, an allowable acceleration of the vehicle system, and a designated warning time, generate an activation message configured to activate or cause an activation of a function associated with the second target location, wherein the one or more processors are further configured to:

determine a required time of arrival of the leading edge or lead vehicle of the vehicle system at the second target location based at least partially on the designated warning time;

determine the estimated time of arrival of the leading edge or lead vehicle of the vehicle system at the second target location based at least partially on a location of the leading edge or lead vehicle of the vehicle system and a speed of the vehicle system after the leading edge or lead vehicle of the vehicle system leaves the first target location; and based at least partially on a difference between the required time that is determined of arrival and the estimated time that is determined of arrival, generate a target speed of the vehicle system.

13. The system of claim 12, wherein the one or more processors are configured to automatically generate the activation message if the leading edge or lead vehicle of the vehicle system leaves the first target location at a time when a projected travel time of the vehicle system to arrive at the second target location, as a function of the allowable speed or acceleration, is less than the designated warning time.

14. The system of claim 12, wherein the one or more processors are configured to generate at least one inhibit message configured to inhibit or prevent, or cause an inhibition or prevention of, activation of the function associated with the second target location.

15. The system of claim 14, wherein the one or more processors are configured to generate the inhibit message before the leading edge or the lead vehicle of the vehicle system arrives at a third target location, the third target location located before the first target location and the second target location on the forward route of the vehicle system.

16. The system of claim 12, wherein the design speed is a design speed associated with the second target location.

17. The system of claim 12, wherein the first target location comprises a station stop signal and the second target location comprises a near side of an island crossing.

* * * * *